United States Patent
Schulze

[11] Patent Number: 5,820,502
[45] Date of Patent: Oct. 13, 1998

[54] TENSION OR GUIDE RAIL FOR A CHAIN DRIVE

[75] Inventor: Peter Schulze, Neufahrn, Germany

[73] Assignee: Joh. Winklhofer & Soehne GmbH & Co., KG, Munich, Germany

[21] Appl. No.: 801,753

[22] Filed: Feb. 18, 1997

[30] Foreign Application Priority Data

Feb. 19, 1996 [DE] Germany ............ 296 02 917.3

[51] Int. Cl.⁶ .................................................. F16H 7/08
[52] U.S. Cl. ........................................... 474/140; 474/111
[58] Field of Search ..................... 474/140, 144, 474/145, 146, 147, 111

[56] References Cited

U.S. PATENT DOCUMENTS

| | | | |
|---|---|---|---|
| 4,832,664 | 5/1989 | Gröger et al. | 474/140 X |
| 5,045,032 | 9/1991 | Suzuki et al. | 474/140 |
| 5,184,983 | 2/1993 | Shimaya t al. | 474/140 X |
| 5,318,482 | 6/1994 | Sato et al. | 474/140 X |

FOREIGN PATENT DOCUMENTS

| | | |
|---|---|---|
| 0 193 802 | 9/1986 | European Pat. Off. . |
| 0 279 934 | 8/1988 | European Pat. Off. . |
| 30 49 106 A 1 | 7/1982 | Germany . |
| 37 061 36C1 | 9/1988 | Germany . |
| 43 10 306 A 1 | 10/1994 | Germany . |

*Primary Examiner*—Thomas R. Hannon
*Attorney, Agent, or Firm*—Seed and Berry LLP

[57] ABSTRACT

In a tension or guide rail (S) for a chain drive, especially in an internal combustion engine, with the rail comprising a carrier (T) formed from filled or reinforced plastics for carrying a slideway lining body (B) of plastics which is connected to the carrier in form-fit and friction-locked fashion, the carrier (T) and the slideway lining body (B) are separately prefabricated constructional units, and the prefabricated slideway lining body (B) is subsequently connected mechanically to the prefabricated carrier (T) by means of form-fit and friction-locking elements.

8 Claims, 1 Drawing Sheet

TENSION OR GUIDE RAIL FOR A CHAIN DRIVE

TECHNICAL FIELD

The present invention relates to a tension or guide rail for chain drive.

BACKGROUND OF THE INVENTION

In a tension rail known from DE-C-37 06 136, the carrier is prefabricated in an injection molding process with dovetailed grooves for fixing the slideway lining body. The carrier is then inserted into another injection mold as core or mold bottom part. The slideway lining body is then shaped by injection molding on the carrier and thereby united with the carrier. Alternatively, it is explained that the slideway lining body should be made in an injection mold and inserted into another injection mold as core or mold bottom part, and the carrier should then be formed by injection molding on the slideway lining body and united with the body. Later, the connection can no longer be released without being destroyed. Furthermore, the process makes it necessary that the whole tension rail is produced by one manufacturer. The two-stage process and the necessity of having the tension rail produced by one manufacturer entails several disadvantages. Since the carrier which has first been injection-molded shrinks during cooling, the injection mold needed for the second process step must be extremely precise and take into account the degree of shrinkage. This is expensive. Moreover, two expensive injection molds are respectively needed for tension rails having different dimensions. This is especially complicated and expensive for the second process step. It is thus not possible to selectively combine the same carrier with several, differently dimensioned slideway lining bodies, or to combine the same slideway lining body with differently dimensioned carriers. Because of the undetachable connection and the tension rail produced by one manufacturer only, the consumer has no possibility of selectively combining, for instance, a carrier with identically shaped or dimensionally slightly different slideway lining bodies, e.g. with slideway lining bodies of different plastics specifications.

In a tension rail known from DE-43 10 306, the slideway lining is connected by form-fit elements to the carrier in such a manner that the slideway lining is freely movable at an end of the tension rail in the longitudinal direction of the rail, namely at the chain discharge end. The connection elements are formed between the slideway lining and the carrier in such a manner that a form-fit connection can only be established by either injection-molding the slideway lining onto the prefabricated carrier or by injection-molding the carrier onto the prefabricated slideway lining, i.e., the two components cannot be prefabricated per se and subsequently interconnected.

In a guide rail known from U.S. Pat. No. 5,045,032, the carrier is preformed from metal before the slideway lining of plastics is provided thereon.

In a tension rail known from DE 30 49 106, the sheet-metal carrier is made by bending and the slideway lining of plastics is subsequently provided.

In a tension or slide rail known from EP-A-0 193 802, an armoring of wear-resistant hard material with a low coefficient of friction is provided on the carrier. The armoring is connected by elastic material to the carrier, which is a cast construction of light metal.

SUMMARY OF THE INVENTION

It is the object of the present invention to provide a tension or guide rail of this type which can be manufactured at low cost and can easily be mounted.

This object is solved according to the present invention.

Thanks to the separately prefabricated constructional units, both injection molds can be produced at low cost, especially because of the dimensional changes caused by shrinkage which are no longer of importance due to the mechanical connection. The consumer of the tension rail can obtain the two constructional units from different manufacturers and can choose every manufacturer according to cost aspects. Since the final consumer will also make the final assembly, possibly performing the assembly in a more cost-conscious manner, the costs will be further reduced. Furthermore, it is possible to selectively combine different slideway lining bodies with a carrier or to combine different carriers with a slideway lining body, the members differing with respect to the material specification dimensionally, especially by such dimensions that have no influence on the connection.

Although it is known in practice and from DE-A-35 06 010 that a light-metal carrier is mechanically connected to a slideway lining body at a later time, the production and assembly costs of such a tension rail are excessively high and the tension rail is unsuitably heavy. Furthermore, with this constructional principle, the carrier and the lining body must normally be produced by different manufacturers.

One exemplary embodiment of the present invention makes it possible to install the connection at low cost and to replace it in case of damage to the slideway lining body or the carrier and to continue to use the undamaged part.

The exemplary embodiment is expedient because the connection elements are formed during the prefabrication of the two constructional units. However, it is also possible to fix the slideway lining body by means of rivets, screws or gluing to the carrier.

Another exemplary embodiment is technically simple with respect to manufacture and assembly. In this embodiment, the carrier back forms the support for the slideway lining body during use. A transverse rib can be used as an abutment for fixing the slideway lining body. Hook type pockets on the carrier body are part of the form-fit and friction-locking elements for establishing the connection.

In another embodiment, the slideway lining body can additionally be positioned in the recesses, namely especially in the longitudinal direction of the carrier back.

In another embodiment, the transverse rib can carry high loads and is insertable into an engagement hook for laterally centering the slideway lining body.

Another embodiment provides a simple installation. The slideway lining body is put over the transverse rib with the hook end and is placed on the carrier back until the snap type hooks snap behind the pocket shoulders. This connection can be released again without any special tools.

The exemplary embodiment is expedient for keeping the side cheeks free from any damaging shear forces.

In another embodiment, the slideway lining body is additionally positioned on the carrier back by means of the projections which snugly fit into the recesses and pass longitudinally arising forces over a large surface into the carrier during operation of the tension rail, thus relieving the side cheeks and, possibly, the hook end.

BRIEF DESCRIPTION OF THE DRAWINGS

An embodiment of the subject matter of the invention will now be explained with reference to the drawing, in which.

DETAILED DESCRIPTION OF THE INVENTION

Figure 1:
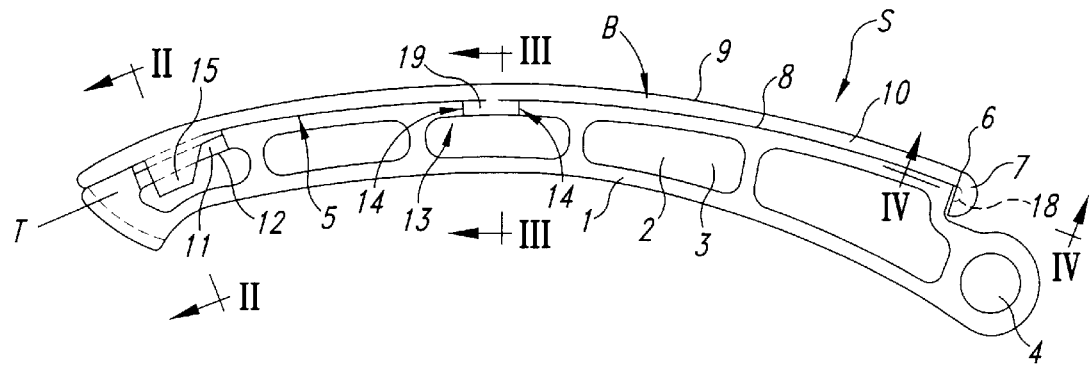
FIG. 1 is a lateral view of a tension rail assembled from prefabricated constructional units.

A tension rail S according to FIG. 1, preferably for use with a control chain drive of an internal combustion engine, consists of a carrier T integrally made from filled or reinforced, especially fiber-reinforced plastics, and of a slideway lining body B which is also made from plastics as a prefabricated unit and subsequently connected to the carrier T, and which may consist of unfilled plastics having good slide and fatigue strength characteristics. The two constructional units T, B are prefabricated separately and interconnected mechanically, for instance by form-fit and friction-locking elements integrally formed on the two constructional units T, B. It would also be possible to connect the slideway lining carrier B mechanically to the carrier T at a later time, namely by means of riveting, screwing, gluing or welding.

Carrier T comprises a rail-like basic body 1 having a plurality of transverse passages 3 which are interrupted by a center partition 2. A bearing eye 4 is molded at and in the end which is at the right side in FIG. 1 (introduction side of a control chain). The upper side of the carrier T forms a carrier back 5 which extends in curved fashion in this embodiment and is planar in transverse direction and whose end facing the bearing eye 4 has formed therebehind a transverse rib 6 with a rounded full cross-section.

Figure 2:
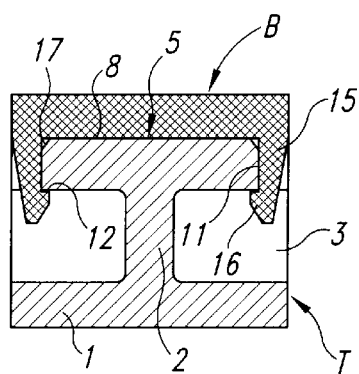
FIG. 2 is a section taken in plane II—II of FIG. 1, on an enlarged scale.
Figure 3:
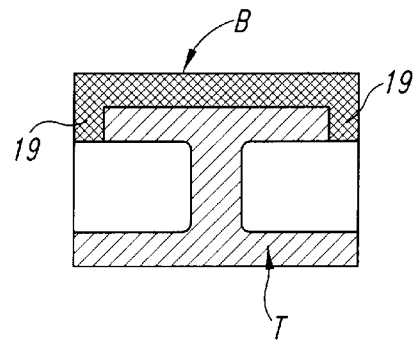
FIG. 3 is a section taken in plane III—III of FIG. 1, on an enlarged scale.

The slideway lining carrier B is a belt 10 having a smooth operative surface 9 and a bottom side 8. An end of the slideway lining carrier B has an integrally molded hook end 7 which on the inside contains a pocket 18 defined at both sides for the transverse rib 6. Near the end portion oriented away from the hook end 7, there are formed two side cheeks 15 which project over the bottom side 8 downwards and whose lower ends form undercut snap type hooks 16 (FIG. 2). Lateral projections 19 which project over the bottom side 8 downwards are formed approximately in the longitudinal center of the basic body 10, but closer to the side cheeks 15.

In the basic body 1 of the carrier T, the end portion which faces away from the bearing eye 4 has formed therein two lateral insertion pockets 11, each of which has an undercut pocket shoulder 12. Furthermore, two lateral recesses 13 which are open towards the carrier back 5 and defined in the longitudinal direction at both sides by stops 14 are formed in the basic body 1.

Figure 4:
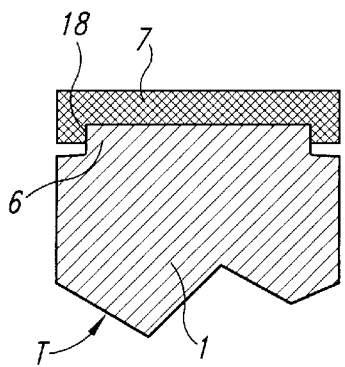
FIG. 4 is a section taken in plane IV—IV of FIG. 1, on an enlarged scale.

To connect the prefabricated constructional units T, B, the hook end 7 is first hooked over the transverse rib 6 (FIG. 4), and the belt is placed on the carrier back 5. The transverse rib 6 recedes at both ends with respect to the width extension of the carrier back 5. As best seen in FIG. 1, the transverse rib 6 has a substantially semi-circular cross-section. Accordingly, the pocket 18 receives the transverse rib therein so it is completely surrounded by the pocket walls, as is illustrated in FIGS. 1 and 4. The lateral projections 19 engage into the recesses 13 and are positioned between the stops 14. The side cheeks 15 slide with their snap type hooks 16 over initially inclined introduction portions 17 into the insertion pockets 11 until the snap type hooks finally grip behind the pocket shoulders 12.

For dismounting, the snap type hooks 16 have just to be disengaged. The slideway lining body B has to be removed from the carrier T by pivoting the body upwards.

I claim:

1. A tension or guide rail for a chain drive of an internal combustion engine, comprising a carrier formed from filled or reinforced plastics for carrying a slideway lining body of plastics which is connected to the carrier in form-fit and friction-locked fashion, the carrier and the slideway lining body having integral matching form-fit and friction-locking elements, the carrier and slideway lining body being separately prefabricated constructional plastic units, and the prefabricated slideway lining body is subsequently connected mechanically to the prefabricated carrier by means of the form-fit and friction-locking elements.

2. A tension or guide rail according to claim 1, further including a releasable mechanical connection between the prefabricated carrier and the prefabricated slideway lining body.

3. A tension or guide rail according to claim 1 wherein the carrier has a carrier back which extends in a convexly curved fashion in a longitudinal direction and is planar in a transverse direction for the slideway lining body, and a transverse rib is formed at an end of the carrier back, and at at least one point which is spaced apart form the transverse rib in longitudinal direction there are proved insertion pockets which are undercut at both sides of and below the carrier back.

4. A tension or guide rail according to claim 3 wherein the insertion pockets are provided at the end portion of the carrier back which faces away from the transverse rib, and the carrier has at least one respective recess formed therein between the insertion pockets and the transverse rib at both sides of and below the carrier back, the at least one respective recess being defined by two stops that are effective in the longitudinal direction of the carrier back.

5. A tension rail guide according to claim 4 wherein the slideway lining body has formed thereon two lateral projections which project over the bottom side of the slideway lining body and form a U-shaped cross-section therewith, and that the width of the projections, when viewed in a longitudinal direction, approximately corresponds to the distance between the stops of each recess.

6. A tension or guide rail according to claim 3 wherein the transverse rib recedes at both ends with respect to the width extension of the carrier back and has a substantially semi-circular cross-section.

7. A tension or guide rail according to claim 3 wherein the slideway lining body is prefabricated with a hook end positionable over the transverse rib, the slideway lining body and the carrier back, each having substantially the same curvature, the insertion pockets of the carrier back being substantially aligned with side cheeks which project over the bottom side of the slideway lining body, the side cheeks are formed in the end portion facing away from the hook end, the side cheeks forming a U-shaped cross-section together with the slideway lining body, and the free ends of the side cheeks are formed as snap hooks oriented towards one another for gripping behind undercut pocket shoulders.

8. A tension or rail guide according to claim 7 wherein the insertion pockets are wider in a longitudinal direction that the side cheeks.

* * * * *